United States Patent [19]

Mendoza et al.

[11] 4,105,188
[45] Aug. 8, 1978

[54] POWER SPRING COMPRESSOR ACCESSORY

[75] Inventors: Gregory E. Mendoza; Donald Ray Henthorn; James Franklin Taylor, all of Simi Valley, Calif.

[73] Assignee: QMA Inc., Simi Valley, Calif.

[21] Appl. No.: 857,127

[22] Filed: Dec. 5, 1977

[51] Int. Cl.² ............................................. B23P 19/04
[52] U.S. Cl. ...................................... 254/10.5; 29/227
[58] Field of Search ................. 254/10.5; 29/215–218, 29/225–227

[56] References Cited

U.S. PATENT DOCUMENTS

| | | | |
|---|---|---|---|
| 3,814,382 | 6/1974 | Castol .................................. | 254/10.5 |
| 3,902,698 | 9/1955 | Furrer et al. ......................... | 254/10.5 |
| 4,009,867 | 3/1977 | Diffenderfer ....................... | 254/10.5 |
| 4,034,960 | 7/1977 | Kloster .................................. | 254/10.5 |

Primary Examiner—Robert C. Watson
Attorney, Agent, or Firm—Ralph B. Pastoriza

[57] ABSTRACT

The accessory device is for use with an hydraulic unit for compressing heavy duty springs. The accessory includes a base plate having feet for engaging lower coils of a spring and a fixed vertical cylinder with its lower end secured to the base plate. A movable cylinder is arranged to telescope over the fixed cylinder and includes laterally extending arms terminating in hooks for engaging over upper coils of the spring. Hydraulic power can be applied to telescope the movable cylinder over the fixed cylinder thereby moving the arms towards the feet and thus compressing a spring positioned therebetween. The relatively large diameters of the cylinders relative to their lengths provides for a very accurate guiding of the downward compressing movement in a rectilinear vertical direction.

7 Claims, 4 Drawing Figures

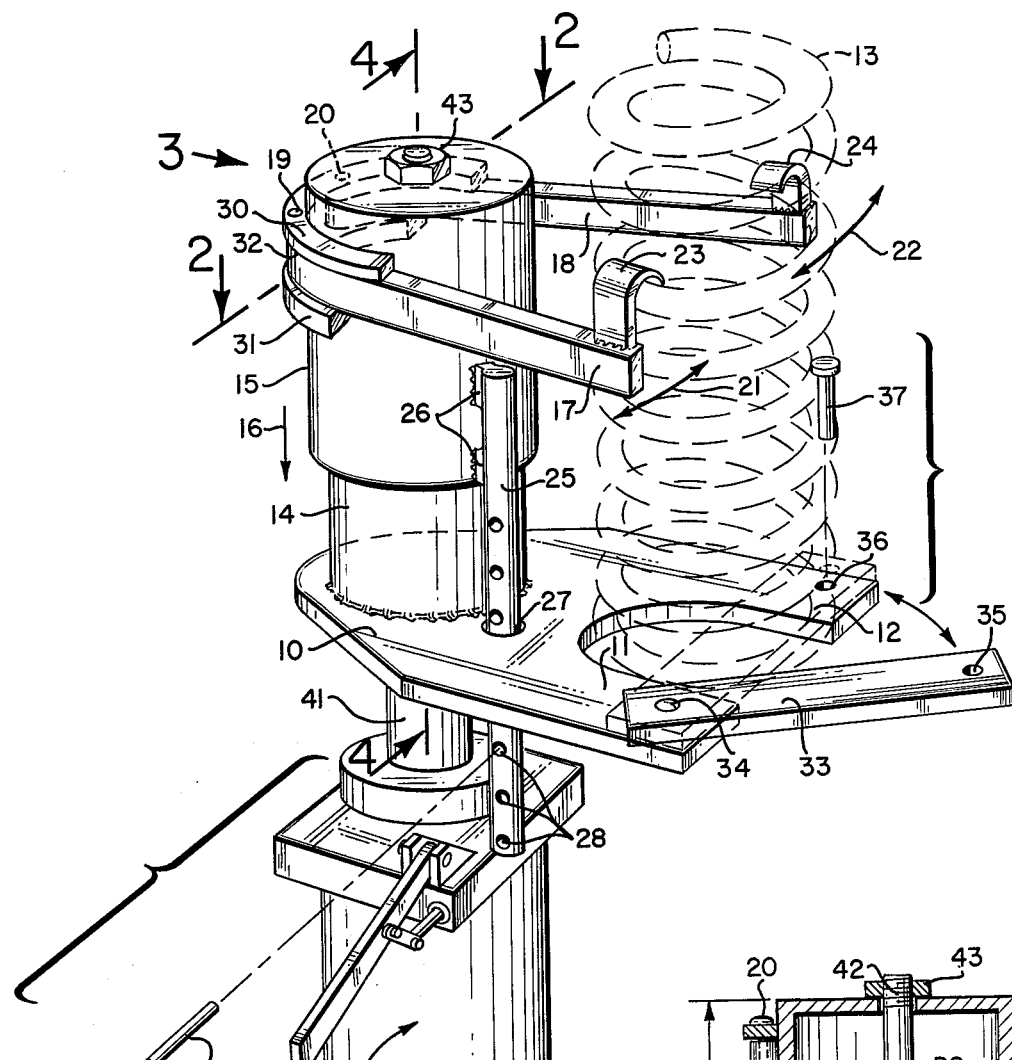
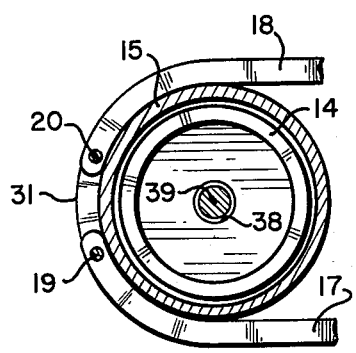
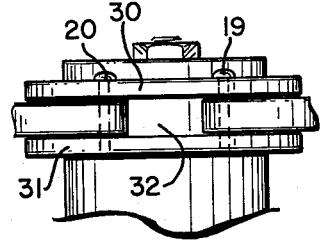
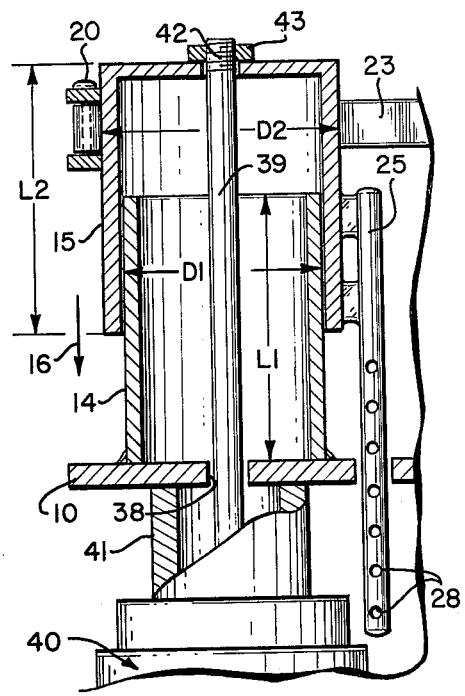
FIG. 1
FIG. 2
FIG. 3
FIG. 4

POWER SPRING COMPRESSOR ACCESSORY

This invention relates generally to accessory tools and more particularly to a power spring compressor accessory for use in various tool shops such as automotive garages.

BACKGROUND OF THE INVENTION

In our copending United States patent application Ser. No. 851,042 filed Nov. 14, 1977, there is disclosed a multi-purpose portable hydraulic unit particularly useful for compressing heavy duty springs. Essentially there is provided a hydraulic piston rod extending from a hydraulic cylinder which will exert a downward pulling force on appropriate hooks engaging upper coils of a spring, the lower coils being held by a similar hook arrangement resting on a collar in turn seated on the cylinder head of the hydraulic unit. In this particular arrangement, the piston rod extends essentially coaxial with the helical turns of the spring.

There are many instances, however, where it is desired to compress a spring without having any of the compressing mechanism extending through the various coils. Such devices for accomplishing this end have taken the form of articulated frame means which can be scissored together to compress a spring. The scissoring together of the frame members is done in certain instances by a screw thread. In other instances, hydraulic power may be used.

While many of the available types of spring compressors are commercially successful, it would be desirable if such a compressor could be provided which not only avoided any mechanism within the helical turns of the spring but moreover assured a rectilinear motion in compressing the spring; that is, a compression force which acted in a direction exactly parallel to the axis of the coil so that all circumferential points of the spring are compressed uniformly. Further, such an accessory device should be capable of being operated by an appropriate hydraulic unit such as disclosed in our above referred-to copending application or alternatively by simple lead screw means.

BRIEF DESCRIPTION OF THE PRESENT INVENTION

Bearing the foregoing considerations in mind, the present invention contemplates a specially designed power spring compressor accessory providing the above mentioned desired features; to wit, a device capable of operation with a hydraulic unit such as disclosed in our referred-to copending application or with a lead screw wherein no portion of the device need extend axially within the coiled spring and wherein absolute rectilinear compression motion is assured.

Briefly, the foregoing features and advantages are attained by providing a horizontal base plate having forwardly extending spaced feet for insertion between adjacent lower coils of a spring to be compressed or for simply seating the bottom-most coils. A fixed vertical cylinder has its lower end secured to the base plate and a movable cylinder in turn is positioned to telescope over the fixed cylinder in vertical coaxial relationship. This movable cylinder in turn carries a pair of forwardly extending arms pivoted to the cylinder for swinging movement in a horizontal plane about parallel vertical axes to bring their extended ends closer or further apart. Appropriate hook means are provided at the end of each of the arms for engaging over an upper coil of a spring to be compressed, the distance between the extended arms being adjusted to conform to the diameter of the spring.

With the foregoing arrangement, and by making the cylinders fairly fat; that is, by making their lengths less than three times their diameters, downward movement of the movable cylinder to telescope over the fixed cylinder results in a vertical rectilinear motion in the compression of the spring.

The movable cylinder can be drawn downwardly over the fixed cylinder by a piston rod from a hydraulic unit such as described in our copending application or by an appropriate lead screw or other equivalent force applying means.

BRIEF DESCRIPTION OF THE DRAWINGS

A better understanding of this invention will be had by now referring to the accompanying drawings in which:

FIG. 1 is a perspective view with certain portions exploded of the power spring compressor accessory of this invention;

FIG. 2 is a fragmentary cross section taken in the direction of the arrows 2—2 of FIG. 1;

FIG. 3 is a rear fragmentary elevational view looking in the direction of the arrow 3 of FIG. 1; and, FIG. 4 is a broken away side elevational view partly in cross section looking in the direction of the arrows 4—4 of FIG. 1.

DETAILED DESCRIPTION OF THE PREFERRED EMBODIMENT

Referring first to FIG. 1, there is shown in the central portion an horizontal base plate 10 having forwardly extending spaced feet 11 and 12 for insertion between adjacent lower coils of a spring to be compressed or, alternatively, for simply seating the bottom coils of the spring. In FIG. 1, the spring is shown in phantom lines at 13.

A fixed vertical cylinder 14 has its lower end secured to the base plate as by welding. Cooperating with this fixed cylinder 14 is a movable cylinder 15 positioned in vertical coaxial telescoping relationship with the fixed cylinder. In the particular embodiment illustrated in FIG. 1, the movable cylinder 15 telescopes over the fixed cylinder 14 and this arrangement constitutes the preferred construction.

The foregoing downward movement of the movable cylinder 15 relative to the fixed cylinder 14 is indicated by the arrow 16 and by making the lengths of the cylinders less than three times their diameters so that they are relatively short and "fat" the downward motion is accurately constrained to a vertical rectilinear direction.

Referring to the upper portion of FIG. 1, there are provided a pair of forwardly extending arms 17 and 18 pivoted to the movable cylinder 15 as at 19 and 20 respectively for swinging movement in a horizontal plane about the vertical axes of the pivots. This arrangement permits the extended ends to be moved closer or further apart as indicated by the double-headed arrows 21 and 22. In this manner, the distance between the extended ends of the arms 17 and 18 can be adjusted to correspond to the diameter of the spring 13.

Hook means indicated at 23 and 24 are secured to the ends of each of the arms for engaging over an upper coil of the spring 13 as illustrated. One of the hook means such as indicated at 23 is spaced at a higher vertical distance than the other so that the same helical coil of the spring 13 is engaged by the hooks.

In accord with a further feature of the preferred embodiment, there is provided an elongated vertical member 25 fixed to a lateral side of the movable cylinder 15 as indicated at 26. This member extends downwardly, the base plate 10 being provided with an opening 27 through which the lower end of the member extends.

As shown in FIG. 1, the lower end portion of the member includes a series of transverse bores along its length for cooperation with a cross pin shown exploded away at 29. The arrangement is such that the cross pin 29 can be passed through that bore immediately adjacent to the lower exit end of the opening 27 beneath the plate 10 to thereby hold the member 25 from being drawn up through the opening so that the movable cylinder is held by this member in its telescoped position to hold the spring 13 compressed even though an applied force is released.

In order to further constrain the arms 17 and 18 to swinging movements in a horizontal plane and inhibit any flexing upwardly or downwardly, there are provided arcuate horizontal flanges 30 and 31 in vertically spaced relationship defining an horizontal arcuate channel 32 therebetween receiving portions of the arms adjacent to their pivot points 19 and 20.

The foregoing arrangement is more clearly illustrated in FIGS. 2 and 3. In FIG. 2, only the lower flange 31 is visible because of the position of the cross section. FIG. 3 illustrates the arcuate channel 32 between the flanges 30 and 31 clearly as well as the pivots 19 and 20 for the arms.

Referring once again to FIG. 1, the overall assembly is completed by the provision of a swing latch 33 having one end pivoted as at 34 to the extending end of the foot 11. The other end of the latch in turn includes a vertical bore 35 arranged to register with another vertical bore 36 in the other extended foot 12 when the latch 33 is swung to the phantom line position. A locking pin 37 shown exploded above the bore 36 can then be inserted through the registering bores to lock the latch 33 in its closed position. With this arrangement, the lower coil of the spring when engaged by the feet will be prevented from slipping off of the feet by the latch; that is, it will be locked in position.

In the embodiment of the accessory illustrated in the drawings, the force applying means or power means for operating the accessory to compress the spring 13 is in the form of a portable hydraulic unit such as described in our heretofore referred-to copending application. Towards this end, and with particular reference to FIG. 4, the plate 10 is provided with a central opening 38 coaxial with the fixed cylinder 14 through which a piston rod shown at 39 in FIG. 4 can be passed. This piston rod extends from a hydraulic unit designated generally by the numeral 40 in FIG. 4 as well as in FIG. 1. Preferably, a collar 41 is provided to seat on the cylinder head and engage the underside of the plate 10.

Appropriate means such as threads 42 and a nut 43 on the end of the piston rod 39 are provided for securing it to the central top portion of the movable cylinder 15 all as clearly shown in FIG. 4.

With the foregoing arrangement, hydraulic pressure is applied to the hydraulic unit 40 to pull the piston downwardly and thereby cause the movable cylinder 15 to telescope over the fixed cylinder 14. It will be understood, of course, and as mentioned heretofore, that any means for applying a force to move the movable cylinder in a downward rectilinear direction, the same being guided by the fixed cylinder could be employed.

OPERATION

The operation of the accessory unit will be evident from the foregoing description. If the device is utilized with a portable hydraulic unit such as indicated in the drawings any spring such as the spring 13 positioned between the feet and the hooks on the arms can readily be compressed by simply applying an hydraulic force to move the piston rod 39 downwardly as described. When a desired degree of compression has been achieved, the pin 29 described in FIG. 1 may be inserted in the first exposed bore 28 from the bottom exit opening of the plate 10 to thereby lock the movable cylinder in its telescoped position. The spring is thus securely held in a compressed state even though the hydraulic power may be released.

As described, the provision of the swingable arms permits accommodating various springs of different diameters. Further, the swing latch 33 coupled to the feet provide an additional safety feature when compressing a spring.

The primary advantages of the accessory unit described heretofore will be evident from the foregoing. Not only is there avoided any coaxially extending member within the helical turns of the spring but in addition, direct downward rectilinear motion is assured as a consequence of the telescoping cylinders. In this respect, and with reference to FIG. 4, the diameter of the fixed cylinder 14 is indicated at D1 and its length at L1. The diameter of the movable cylinder 15 is indicated at D2 and its length at L2. By assuring that the lengths L1 and L2 are always less than three times the diameters D1 or D2, sufficient strength against tendency for telescoping tubes to bend is assured.

From all of the foregoing, it will thus be evident that the present invention has provided a greatly improved accessory particularly useful with power spring compressing machinery.

We claim:

1. A power spring compressor accessory comprising, in combination:
   (a) an horizontal base plate having forwardly extending spaced feet for insertion between adjacent lower coils of a spring to be compressed;
   (b) a fixed vertical cylinder having its lower end secured to said base plate;
   (c) a movable cylinder positioned in vertical coaxial telescoping relationship with said fixed cylinder;
   (d) a pair of forwardly extending arms pivoted to said movable cylinder for swinging movement in a horizontal plane about parallel vertical axes to bring their extended ends closer or further apart; and,
   (e) hook means secured to each extending end of said arms for engaging over an upper coil of said spring to be compressed, the distance between the extended ends being adjusted to correspond to the diameter of said spring whereby application of a force telescopes said movable cylinder downwardly with respect to said fixed cylinder to result in compression of a spring positioned between said feet and said arms, the telescoping action of said cylinders providing for a vertical rectilinear motion in the compression of said spring.

2. An accessory according to claim 1, including an elongated vertical member fixed to a lateral side of said movable cylinder and extending downwardly, said base plate having an opening through which the lower end of said member extends, said member having a series of transverse bores therethrough along the lower portion of its length; and a cross pin receivable in any one of said bores such that when a spring is compressed said cross pin can be passed through that bore immediately adjacent to the lower exit end of said opening beneath said plate to thereby hold said member from being drawn up through said opening so that said movable cylinder is held by said member in its telescoped position to hold said spring compressed even though the applied force is released.

3. An accessory according to claim 1, in which an upper exterior wall portion of said movable cylinder includes arcuate horizontal flanges in vertically spaced relationship defining an horizontal arcuate channel therebetween receiving portions of said arms adjacent to their pivoting points to further constrain swinging movement of the extended ends of said arms to said horizontal plane.

4. An accessory according to claim 1, in which said plate includes an opening coaxial with said fixed cylinder through which a piston rod may be passed; and means for securing the upper end of the piston rod to the central top portion of the movable cylinder so that a downward pulling force on said piston rod will telescope said movable cylinder downwardly relative to said fixed cylinder.

5. An accessory according to claim 1, in which said movable cylinder telescopes over said fixed cylinder, the lengths of each of said cylinders being less than three times their diameters respectively.

6. An accessory according to claim 1, including a swing latch having one end pivoted to the end of one of said feet for swinging movement in an horizontal plane, and its other end provided with a vertical bore the end of the other of said feet having a vertical bore positioned to register with the bore in said latch when said latch is swung to a position to overlap said end of said other of said feet; and a lock pin receivable through said registering bores to hold said latch in its swung position whereby the lower coils of said spring when engaged by said feet will be enclosed by said latch.

7. An accessory according to claim 1, in which one of said hook means at the end of one of said arms is vertically slightly higher than the other of said hook means so that the same helical coil of the spring is engaged by said hook means.

* * * * *